United States Patent
Bolukbasi

(10) Patent No.: US 6,328,259 B1
(45) Date of Patent: Dec. 11, 2001

(54) VARIABLE-LOAD SHEAR COLLAR FOR HELICOPTER LANDING GEAR SHOCK STRUTS

(75) Inventor: Akif O. Bolukbasi, Phoenix, AZ (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/587,954

(22) Filed: Jun. 6, 2000

(51) Int. Cl.$^7$ .................................................. B64C 25/20
(52) U.S. Cl. .............................. 244/102 SS; 244/102 SL; 188/371
(58) Field of Search .................. 244/102 SL, 102 SS, 244/102 A, 100 R; 188/371, 129, 375, 376, 300; 293/132, 133

(56) References Cited

U.S. PATENT DOCUMENTS

| | | |
|---|---|---|
| 3,538,785 * | 11/1970 | Grancon . |
| 3,697,108 * | 10/1972 | Diener . |
| 3,716,208 | 2/1973 | Fagan et al. . |
| 3,763,740 | 10/1973 | Fletcher et al. . |
| 3,997,133 * | 12/1976 | Fagen . |
| 4,361,212 | 11/1982 | Bolang et al. . |
| 4,759,430 | 7/1988 | Kalin . |
| 4,823,923 * | 4/1989 | Moyer . |
| 5,090,755 | 2/1992 | Garnweidner . |
| 5,294,077 | 3/1994 | Derrien . |
| 5,337,976 | 8/1994 | Derrien . |
| 5,547,148 | 8/1996 | Del Monte et al. . |
| 5,927,646 | 7/1999 | Sandy et al. . |
| 6,062,355 * | 5/2000 | Nohr et al. . |

* cited by examiner

Primary Examiner—Charles T. Jordan
Assistant Examiner—Tien Dinh
(74) Attorney, Agent, or Firm—Harness Dickey & Pierce P.L.C.

(57) ABSTRACT

A shock strut is provided for a landing gear assembly in an aircraft including a variable load shear collar. The shock strut includes a housing having first and second pistons axially disposed therein. An annular shear collar is rotatably coupled about the housing and includes an inner radial wall, an outer radial wall and a plurality of axially spaced apart shear flanges radially extending from the inner radial wall. The second piston includes a plurality of axially spaced apart force transmitting flanges radially extending therefrom which abuttingly engage the plurality of shear flanges. The degree to which the force transmitting flanges engage the shear flanges corresponds to a circumferential orientation of the shear collar relative to the second piston. The amount of abutting engagement dictates the amount of force required to shear the shear flanges, thereby allowing the second piston to stroke.

20 Claims, 2 Drawing Sheets

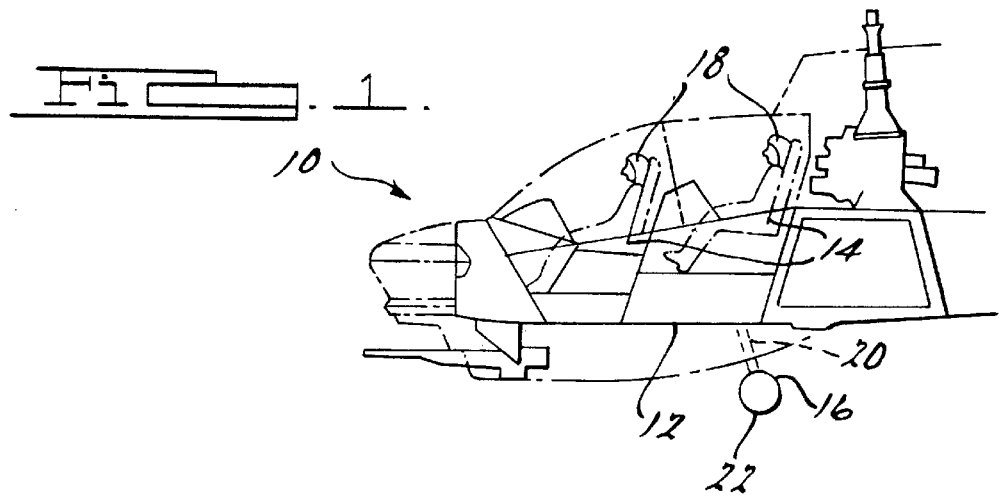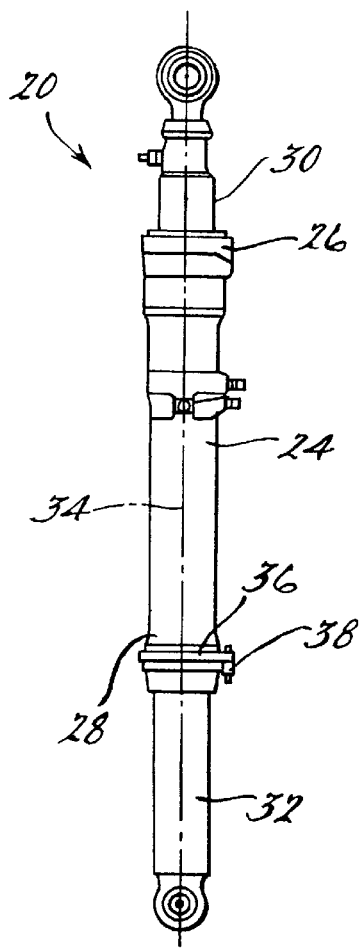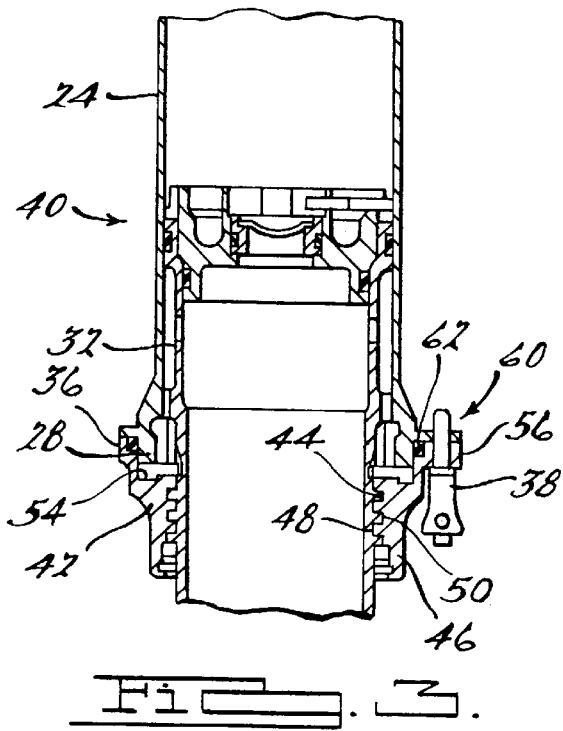

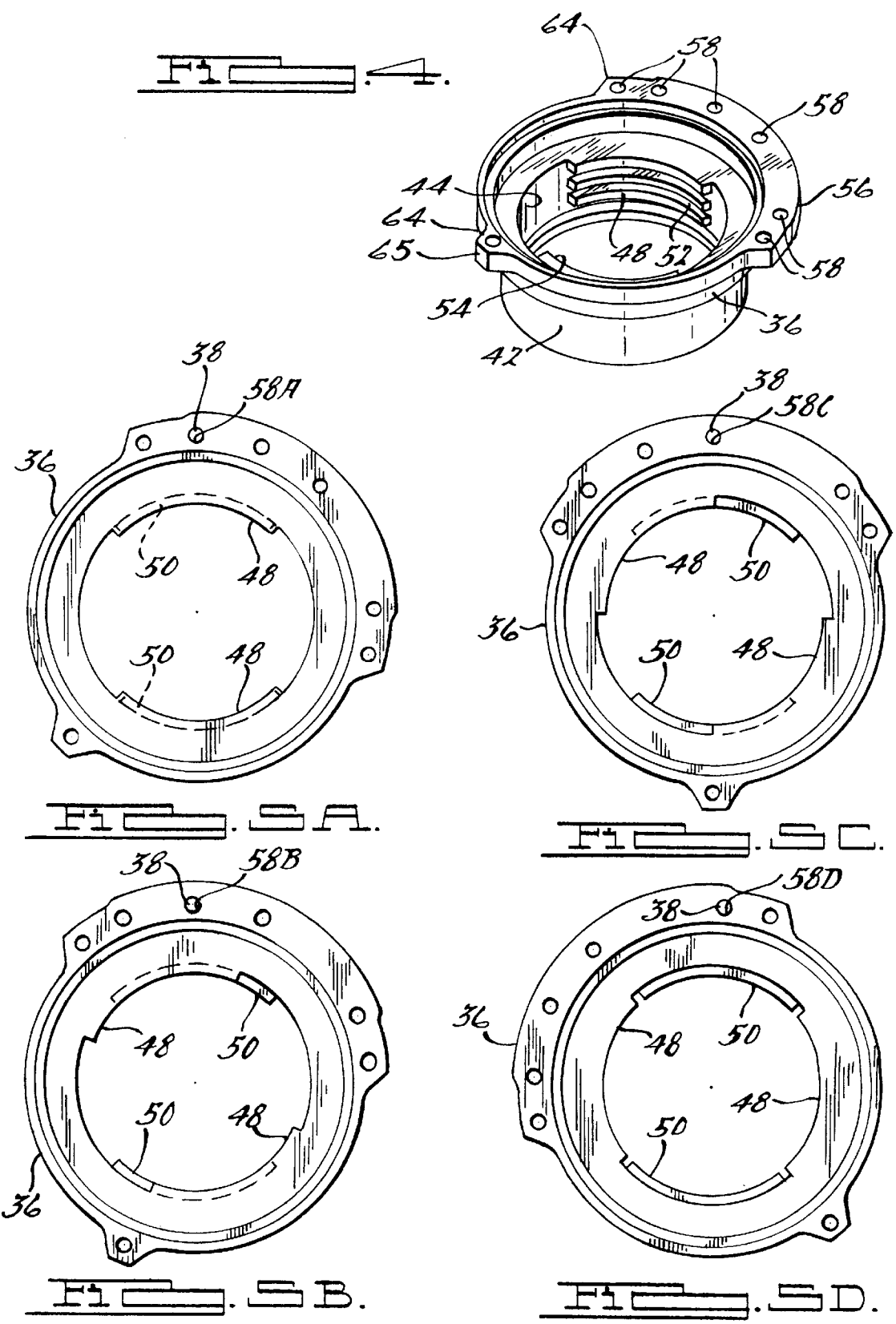

VARIABLE-LOAD SHEAR COLLAR FOR HELICOPTER LANDING GEAR SHOCK STRUTS

TECHNICAL FIELD

The present invention generally relates to aircraft landing gear assemblies and, more particularly, to a landing gear assembly including a variable load shear collar.

BACKGROUND OF THE INVENTION

All modern aircraft employ some type of landing gear assembly for supporting the aircraft fuselage above the ground when the aircraft is not in flight. Virtually all landing gear assemblies include some type of shock absorption system. These shock absorption systems are not only necessary for normal landings, but are also critical for hard and/or crash landings.

The landing gear in a rotorcraft, such as a helicopter, must be able to protect the airframe and mission equipment during hard landings. Further, the landing gear must be able to increase the survivability of the rotorcraft occupants during crash impacts. This is accomplished by designing the landing gear to absorb a significant part of the impact energy during the hard or crash landing.

Rotorcraft landing gears are calibrated in terms of sink speed. Military rotorcraft are required to function in vertical sink speed ranges from 10 ft/sec for normal landings to 42 ft/sec for crash landings. In order to provide protection to the airframe, mission equipment package, and occupants over this wide range of impact sink speeds, landing gear having multiple-stage shock struts have been utilized.

A common multiple-stage shock strut employs a first-stage nitrogen-oil type oleo. The first stage functions in landing sink speeds up to the reserve energy condition of about 12 ft/sec. During such low landing sink speeds, the second-stage is static. However, during landing sink speeds that exceed the reserve energy condition, including crash conditions, the second-stage of the shock strut is activated.

One way to activate the second-stage involves the controlled mechanical failure of design features within the shock strut such as an internal diaphragm, shear pin, or shear collar. Prior to the controlled mechanical failure, the second-stage is static and does not stroke. However, upon the controlled mechanical failure, the second-stage of the shock strut strokes and absorbs the landing force. While most shock strut second-stages include a stroking piston similar to the first stage, some landing gear shock strut second-stage designs consist entirely of mechanical devices such as crushable tubes.

The major limitation of current military rotorcraft landing gear is that each shock strut assembly is designed for a specific aircraft gross weight. The landing gear performance degrades when it is employed in an aircraft having a higher gross weight. This may result in increased airframe and mission equipment package damage during hard and/or crash landings. Therefore, derivative or second generation rotorcraft having increased gross weights require the redesign and requalification testing of suitable landing gear. Unfortunately, redesigning and requalifying landing gear is expensive and time-consuming.

In view of the foregoing, it would be desirable to provide a landing gear assembly including a variable force activation device for enabling it to be employed on aircraft having different gross weights. As such, the same landing gear could be used for a family of aircraft designs without requiring landing gear redesign or requalification.

SUMMARY OF THE INVENTION

The above and other objects are provided by a multiple stage shock strut having a first and second-stage. The first-stage is separated from the second-stage by a variable-load shear collar. Upon the application of a pre-selected force to the shear collar by the first-stage, the shear collar experiences a controlled mechanical failure. This activates the second-stage of the shock strut. Advantageously, the shear collar includes an adjustment mechanism which enables variation of the force required for causing the mechanical failure. As such, the shock strut may be employed on different aircraft having different gross weights.

In a preferred embodiment of the present invention, the multiple stage shock strut includes a housing having a first and second piston axially disposed therein. An annular shear collar is rotatably coupled about the housing and includes an inner radial wall, an outer radial wall and a plurality of axially spaced apart shear flanges radially extending from the inner radial wall. The second piston includes a plurality of axially spaced apart force transmitting flanges radially extending therefrom which abuttingly engage the plurality of shear flanges. The degree to which the force transmitting flanges engage the shear flanges corresponds to a circumferential orientation of the shear collar relative to the second piston. The amount of abutting engagement dictates the amount of force required to shear the shear flanges, thereby allowing the second piston to stroke.

To change the circumferential orientation of the shear collar, a flange is provided radially extending from the outer radial wall. The flange includes a plurality of index holes circumferentially spaced apart along the flange. An index pin is selectively inserted through a preselected index hole to rotatably align the shear collar relative to the second piston. Preferably, the plurality of shear flanges and the plurality of force transmitting flanges are interrupted along the inner radial wall and the second piston such that the shear collar can be rotated to completely disengage the shear flanges from the force transmitting flanges.

BRIEF DESCRIPTION OF THE DRAWINGS

The various advantages of the present invention will become apparent to one skilled in the art by reading the following specification and subjoined claims and by referencing the following drawings in which:

FIG. 1 is a side elevational view of an aircraft incorporating a landing gear assembly incorporating the teachings of the present invention;

FIG. 2 is a more detailed side view of the shock strut assembly of FIG. 1;

FIG. 3 is a sectional view of the housing, second piston, and variable load shear collar of FIG.2;

FIG. 4 is a perspective view of the variable load shear collar of FIG. 3; and

FIGS. 5A–5D are top views of the variable load shear collar of the present invention at different orientations relative to the force transmitting flange of the second piston.

DETAILED DESCRIPTION OF THE PREFERRED EMBODIMENTS

The present invention is directed towards a landing gear assembly including a variable load shear collar. The shear collar is mounted between the first and second-stages in a shock strut. By adjusting the orientation of the shear collar, the force at which the shear collar will fail, thereby activating the second-stage of the shock strut, can be varied. This allows the same landing gear assembly to be used on different aircraft with different gross weights.

Turning now to the drawing figures, FIG.1 illustrates a rotorcraft 10 in the form of a helicopter incorporating the teachings of the present invention. The rotorcraft 10 includes a fuselage 12, seats 14, and landing gear assembly 16. The fuselage 12, seats 14, and landing gear 16 combine to form an energy dissipation subassembly for protecting the fuselage 14 and increasing the survivability of occupants 18 during a hard or crash landing. An important member of this subassembly is the shock strut 20 which interconnects the fuselage 12 and a wheel 22.

Referring now to FIG. 2, the shock strut 20 of FIG. 1 is illustrated in greater detail. The shock strut 20 includes a cylindrical housing 24 having a first end 26 and an opposite second end 28. A first piston 30 is axially disposed within the cylindrical housing 24 at the first end 26. In combination, the first piston 30 and housing 24 form a first-stage energy dissipating assembly of the shock strut 20. The first-stage of the shock strut 20 is preferably a nitrogen-oil type oleo that compresses during normal landing sink speeds up to an energy condition of approximately 12 feet per second. As such, the first piston 30 moves axially with respect to the housing 24 to absorb the impact of normal landings.

The shock strut 20 also includes a second cylinder 32 axially disposed in the housing 24 at the second end 28. The second piston 32 is axially aligned with the first piston 30 along a longitudinal axis 34 of the shock strut 20. An annular shear collar 36 is rotatably disposed about the housing 24 and second piston 32. As will be described in greater detail below, the annular orientation of the shear collar 36 controls the level of force required to allow the second piston 32 to move relative to the housing 24. The annular orientation of the shear collar 36 is controlled by an index pin 38.

In combination, the housing 24, second piston 32, and shear collar 36 form a second-stage energy dissipation assembly of the shock strut 20. The second-stage of the shock strut 20 is preferably a hydraulic damper that functions in hard and crash landing sink speeds greater than 10 feet per second and may handle sink speeds up to 42 feet per second without collateral damage. More particularly, the shear collar 36 prevents the second-stage from compressing (i.e., the second piston 32 from stroking relative to the housing 24) during normal landings but allows such compression upon the receipt of the increased loads experienced during hard or crash landings.

Referring now to FIG. 3, the housing 24, second piston 32, and shear collar 36 are illustrated in greater detail. As can be seen, the second piston 32 is slidably received within an inner volume of the housing 24. The second piston 32 includes a valving mechanism, generally indicated at 40, for controlling the compression rate of the second piston 32 relative to the housing 24.

The shear collar 36 includes an annular body 42 having an inner radial wall 44 and an outer radial wall 46. The inner radial wall 44 includes a plurality of axially spaced apart shear flanges 48 radially extending therefrom. The piston 32 includes a plurality of force transmitting flanges 50 radially extending therefrom and abuttingly engaging the shear flanges 48 via a meshing arrangement.

Referring now also to FIG. 4, the shear flanges 48 are preferably interrupted along the inner circumference of the annular body 42 so as to be divided into a first shear flange section 52 and a second shear flange section 54 extending from opposite portions of inner radial wall 44. The first and second shear flange sections 52 and 54 are circumferentially spaced apart along inner wall 44 such that a space is provided therebetween. Preferably, the force transmitting flanges 48 of the second piston 32 are also interrupted along the perimeter of the second piston 32 so as to be divided into two sections which are spaced apart from one another (See FIGS. 5A–5D). The shear flanges 48 and force transmitting flanges 50 preferably have arc lengths which are slightly less than 90 degrees such that the flanges 48 and 50 may be axially aligned so as to completely overlap one another or be circumferentially offset from one another to completely disengage.

The shear collar 36 also includes a housing seat 54 for receiving the second end 28 of the housing 24. A flange 56 radially extends from the annular body 42 above the housing seat 54 to form an indexing mechanism. The flange 56 includes a plurality of circumferentially spaced apart indexing holes 58 formed therethrough for receiving index pin 38. The indexing holes 58 independently align with a hole 60 formed in a flange 62 radially extending from the housing 24. As such, the shear collar 36 can be rotated to move the shear flanges 48 relative to the force transmitting flanges 50 to vary the amount of abutting engagement therebetween.

By rotating the annular body 42 relative to the housing 24, a preselected index hole 58 is aligned with hole 60. Upon insertion of index pin 38 through index hole 58 and hole 60, the annular body 42 is rotatably fixed relative to the housing 24 and second piston 32. Simultaneously, a preselected overlap of shear flanges 48 with force transmitting flanges 50 is established.

Flange 56 also includes a plurality of circumferentially spaced apart roller holes 64. If desired, a separate flange 65 may be provided for forming an independent roller hole 64. Roller holes 64 accommodate a plurality of conventional rollers (not shown) rotatably interengaging the shear collar 36 and the housing 24.

Referring now to FIGS. 5A–5B, the operation of the shear collar 36 will be further described. In FIG. 5A, the shear collar 36 has been rotated such that the index pin 38 is inserted through index hole 58A. In this orientation, the shear flanges 48 abuttingly engage 100 percent of the force transmitting flanges 50. As such, a maximum resistance to shear failure is provided. This is the preferred orientation for providing the highest shear load requirement for the heaviest aircraft gross weight.

In FIG. 5B, the shear collar 36 has been rotated such that index pin 38 is inserted through index hole 58B. In this orientation, the shear flange 48 abuttingly engages approximately 75 percent of the force transmitting flange 50. As such, a reduced amount of force is required to cause a mechanical failure of shear flanges 48. This is the preferred orientation for providing an intermediate shear load requirement for an intermediate aircraft gross weight.

In FIG. 5C, the shear collar 36 has been rotated such that index pin 38 is inserted through index hole 58C. In this orientation, shear flange 48 abuttingly engages approximately 50 percent of force transmitting flange 50. As such, an even lower amount of force is required for causing a mechanical failure of shear flanges 48. This is the preferred orientation for providing the lowest shear load requirement for the lightest aircraft gross weight.

In FIG. 5D, the shear collar 36 has been rotated such that index pin 38 is inserted through index hole 58D. In this orientation, the shear flanges 48 are disengaged from the force transmitting flanges 50. As such, no mechanical failure is required to allow stroking. This is the preferred orientation for eliminating a shear load requirement for kneeling the aircraft during maintenance and transportation.

In operation, the shear flanges 48 prevent the second piston 32 from stroking during normal landings. However, during hard landings and crash impacts, the force transmitting flanges 50 of second piston 32 exert a large force on the shear flanges 48. If the landing force is great enough, the shear flanges 48 mechanically fail by shearing, thereby allowing the second piston 32 to stroke within the housing 24. The landing load required to shear the shear flanges 48 corresponds to the amount of abutting engagement between the shear flanges 48 and the force transmitting flanges 50 of the second piston 32. Preferably, the required shear load is increased for higher aircraft gross weights.

Advantageously, the variable load shear collar 36 of the present invention allows the same landing gear design to be used for a family of aircraft by simply adjusting the index position of the variable load shear collar 36 to position the shear flanges 48 appropriately for the gross weight of the aircraft into which it is incorporated. This eliminates the need for redesign and requalification of landing gear for second or later generation aircraft. Even more advantageously, the adjustment of the variable load shear collar 36 can be made quickly and easily by a simple indexing step.

The performance of the variable load shear collar of the present invention in terms of shear loads at various engagement positions has been analytically calculated and compared with landing gear dynamic test data. The analysis and test results show excellent agreement. For example, a sample analytical calculation at the 100% engagement and compared with the available test data is as follows:

$F_{su}$=39 ksi (7075-T73 Tubing)

Area=2.20 in$^2$ $F_{shear}$=Area×$F_{su}$=2.20×39,000=85,800 lb. (Analysis)

$F_{shear}$=85,000 lb. (Test-Reference 1)

Thus, the present invention enables landing gear stroking loads and performance to be tailored to the gross weight of an aircraft thereby reducing airframe and mission equipment damage during hard landings. The analytical results indicate that up to 30 percent aircraft gross weight can be accommodated by the present invention. Although the present invention is ideally suited for military rotorcraft such as the Apache helicopter, other helicopter designs will also benefit from the basic concept of having a variable-load controlled mechanical failure shock strut design.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A variable load shear collar for a force absorbing assembly comprising:
    a body;
    at least one shear flange laterally extending from said body; and
    an indexing mechanism adjustably interconnecting said body and said force absorbing assembly such that said shear flange variably engages a force transmitting member of said force absorbing assembly.

2. The shear collar of claim 1 wherein said at least one shear flange radially extends interior of said body.

3. The shear collar of claim 1 wherein said at least one shear flange has a length which is less than a circumference of said body.

4. The shear collar of claim 1 wherein said indexing mechanism further comprises a plurality of holes spaced apart in said body for receiving an indexing pin therethrough which is cooperable with a complimentary indexing hole formed in said force absorbing assembly.

5. The shear collar of claim 1 wherein said body further comprises an annular member.

6. The shear collar of claim 5 wherein said annular member includes an inner radial wall and an outer radial wall, said at least one shear flange radially extending from said inner radial wall.

7. The shear collar of claim 6 wherein said at least one shear flange further comprises a first shear flange section circumferentially spaced apart from a second shear flange section along said inner wall.

8. The shear collar of claim 7 wherein said first shear flange section is formed opposite said second shear flange portion.

9. The shear collar of claim 7 wherein said shear flange further comprises a plurality of axially spaced apart shear flanges.

10. The shear collar of claim 7 wherein said indexing mechanism further comprises a flange radially extending from said annular member, said flange including a plurality of holes formed therethrough at spaced apart locations for receiving an index pin therethrough.

11. A shock strut comprising:
    a housing;
    a first piston disposed in said housing;
    a second piston disposed in said housing; and
    a shear collar disposed at a first end of said second piston, said shear collar preventing said second piston from stroking prior to experiencing a pre-selected force, said shear collar including an adjustment mechanism for adjusting a level of said pre-selected force.

12. The shock strut of claim 11 wherein said adjustment mechanism further comprises a shear flange abuttingly engaging said first end of said second piston, said shear flange being indexable to vary an amount said shear flange abuttingly engages said first end of said second piston.

13. The shock strut of claim 11 wherein said first end of said second piston includes a force transmitting flange extending therefrom and abuttingly engaging said shear flange.

14. The shock strut of claim 11 wherein said shear flange is indexed by rotating said shear collar relative to said second piston.

15. The shock strut of claim 14 wherein a removable index pin fixes said shear collar at a preselected orientation relative to said second piston.

16. The shock strut of claim 11 wherein said shear collar is disposed outboard of said second piston and is coupled to said housing.

17. A shock strut for a landing gear assembly in an aircraft comprising:
    a housing;
    a first piston axially disposed within said housing;
    an annular shear collar rotatably coupled about said housing, said shear collar including an inner radial wall, an outer radial wall and a plurality of axially spaced apart shear flanges radially extending from said inner radial wall; and a second piston axially disposed within said housing, said second piston including a plurality of axially spaced apart force transmitting flanges radially extending therefrom and abuttingly engaging said plurality of shear flanges by a circumferential amount corresponding to a circumferential orientation of said shear collar relative to said second piston.

18. The shock strut of claim 17 wherein said shear collar includes a flange radially extending from said outer radial wall, said flange including a plurality of index holes circumferentially spaced apart along said flange, said indexing holes selectively receiving an index pin therethrough for rotatably aligning said shear collar relative to said second piston.

19. The shock strut of claim 18 wherein said housing includes a radial flange extending therefrom, said radial flange including a hole formed therethrough for receiving said index pin.

20. The shock strut of claim 17 wherein said plurality of shear flanges and said plurality of force transmitting flanges are interrupted along said inner radial wall and said second piston respectively such that said shear collar can be rotated to disengage said shear flanges from said force transmitting flanges.

* * * * *